United States Patent

Hassan et al.

[19]

[11] Patent Number: 6,052,082
[45] Date of Patent: Apr. 18, 2000

[54] METHOD FOR DETERMINING A VALUE FOR THE PHASE INTEGER AMBIGUITY AND A COMPUTERIZED DEVICE AND SYSTEM USING SUCH A METHOD

[75] Inventors: Azmi Hassan, Johor Bharu, Malaysia; David Mezera, Madison, Wis.

[73] Assignee: Wisconsin Alumni Research Foundation, Madison, Wis.

[21] Appl. No.: 09/078,823

[22] Filed: May 14, 1998

[51] Int. Cl.[7] .............................. G01S 5/02; H04B 7/185
[52] U.S. Cl. ........................................................ 342/357.04
[58] Field of Search ................................ 342/357.04, 442

[56] References Cited

U.S. PATENT DOCUMENTS

| | | |
|---|---|---|
| 4,812,991 | 3/1989 | Hatch . |
| 4,963,889 | 10/1990 | Hatch . |
| 5,825,326 | 11/1998 | Semier et al. ................... 342/357.04 |

OTHER PUBLICATIONS

Euler H., Achieving High Accuracy Relative Positioning in Real–Time: System Design, Performance and Real–Time Results. IEEE Position Location and Navigation Symposium (1994).

Errikson, C., An Analysis of Ambiguity Resolution Techniques for Rapid Static GPS using Single Frequency Data. Fifth International Technical Meeting of the Satellite Division of the ION, Albuquerque, New Mexico, Sep. 16–18 (1992).

Hatch R. And Euler H., Comparison of Several AROF Kinematic Techniques. Proceedings of the ION GPS 94, Salt Lake City, Utah. (1994).

Hwang P., Kinematic GPS: Resolving Integer Ambiguities on–the–fly. IEEE Position Location and Navigation Symposium, Las Vegas, Mar. 20–23. (1989).

Computational Science Education Project (e–book), Section B—Selected Computational Methods Mathematical Optimization (updated Jan. 1996), subsections 1.1–1.4, 4.2, 4.3, and 5).

Quality Engineering and Survey Technology Ltd., four sections labeled A, B, C, and D. Copyright dated 1996 (month of publication unknown).

"GPS Overview" University of Texas (4 pages), publication date unknown.

"Precise GPS Positions" (3 pages), publication date unknown.

*Primary Examiner*—Thomas H. Tarcza
*Assistant Examiner*—Fred H Mull
*Attorney, Agent, or Firm*—Macheledt Bales & Johnson LLP

[57] ABSTRACT

A method for determining a value for an integer number of phases using a computerized device, having steps: (a) providing an initial set comprising a plurality of coded integer ambiguity strings; (b) based upon a computed fitness value for each string in the initial set, choosing a selected plurality of integer ambiguity strings; and, (c) using information components from at least a first and second string of this selected plurality, generating a first and second offspring ambiguity string for evaluation. Additional steps: prior to choosing, calculating a probability of selection in connection with each computed fitness value; and generating additional offspring ambiguity strings for which fitness values can be computed. An optimal determination of the value can be used for determination of a position. The method of the invention can be incorporated into a global positioning system (GPS). Also, a computerized device for receiving a signal transmitted from a distant source (device has a processor for determining a value for an integer number of phases.). And a system for determining a position having a source for transmitting a signal wave and a computerized device, located a distance from the source.

20 Claims, 4 Drawing Sheets

^ INDICATES THE CROSSOVER POINT LOCATIONS AFTER THE SEVENTH BIT.

METHOD FOR DETERMINING A VALUE FOR THE PHASE INTEGER AMBIGUITY AND A COMPUTERIZED DEVICE AND SYSTEM USING SUCH A METHOD

BACKGROUND OF THE INVENTION

In general, the present invention relates to methods, devices, and systems for providing position, velocity and time information in all types of weather, such as the satellite navigation system known as NAVSTAR GPS (NAVigation Satellite Timing And Ranging Global Positioning System—herein, GPS), and more particularly, the invention relates to a new method, new computerized signal receiving device, and new system for determining an optimal value for an integer number of phases or cycles of a signal wave being transmitted from a distant source. In Global Positioning Systems, the integer number of phases, or cycles/wavelengths in the frequency domain, of the carrier signal wave(s) that stretches between the satellite and receiver is referred to as the "integer ambiguity" (or simply "ambiguity"). The ambiguity must be resolved before a position of the receiver can be determined. Although the discussion of the novel method, device, and system of the invention will focus on methods and components of the popular, well developed GPS, the invention has wider applications and need not be limited as such.

The GPS has been used for years as a tool for surveying, strategic military locating, and more-recently in commercial and private vehicles and aircraft navigation. As is well known, GPS satellites transmit two L-band pure sinusoid signals ("carrier" signals $L_1$ and $L_2$) into which a course/acquisition, or clear/access (C/A), pseudo random binary code and a precise (P) pseudo random binary code are modulated. This modulation, or alteration, of the pure sine wave signals is done to permit time delay measurements to be made for positioning purposes. The C/A and P codes consist of sequences of binary values (zeros and ones) generated by hardware devices called tapped linear feedback registers which are capable of generating a sequence of ones and zeros that does not repeat during some particular chosen interval of time. An appropriately equipped GPS receiver can independently locally replicate these code sequences and align the replicated sequence with the corresponding sequence contained in the received signal. Then, by knowing the instant of time the code sequence was transmitted, the signal's travel time can be determined so that the range from receiver to satellite can be computed. Even though all the signals transmitted from the several GPS satellites utilize the same frequencies, each satellite has its own unique identifier code so that a receiver can distinguish between signals received from different satellites.

The fundamental clock frequency, "$f_o$", is 10.23 MHz: This is the frequency at which the two L-band carriers are transmitted from each satellite. The $L_1$ carrier has a frequency of 1575.42 MHz and a wavelength of approximately 19 cm. The $L_1$ carrier is modulated by the C/A code which consists of 1023 binary chips transmitted at a frequency that is one-tenth of $f_o$ so that it repeats every millisecond. The $L_2$ carrier has a frequency of 1227.60 MHz and a wavelength of approximately 24 cm. Since the Anti Spoofing (AS) feature of the GPS signal was activated (January 1994), the P code has been encrypted and is no longer accessible to unauthorized users who must rely on codeless technology to obtain $L_2$ carrier phase measurements. Therefore, as will be better appreciated, it is desirable to eliminate the need to rely on P code and/or the $L_2$ carrier phase measurements for determining a receiver's position.

Two Types of GPS Measurements: A code tracking measurement (the so-called "pseudorange measurement") is obtained by correlating the C/A modulation of a received signal with a corresponding sequence generated in a receiver. The code measurement equals the observed difference in time between a satellite clock and the receiver clock generating the local modulation sequence. Because the C/A code is repeated so often, a receiver can quickly lock onto a received signal and begin matching the received code with the corresponding code generated within the receiver. Another type of measurement that can be taken from GPS satellites is a carrier phase measurement where the relative phase is measured between the received, reconstructed carrier phase and the receiver clock phase at a particular epoch (i.e., defined measurement period—ranging from an hour or more to a fraction of a second): For reference, see FIG. 1 schematic.

FIG. 1 (at 10) represents a positioning system such as the popular GPS. GPS code measurements are substantially noisier than the carrier phase measurements 18. And, although prone to receiver and satellite biases and errors (as well as tropospheric and ionospheric delays), a carrier phase measurement can give more-accurate measurements of the change in the pseudorange with time and of the fractional wavelength of the pseudorange distance to the satellite. When a GPS receiver (FIG. 1 at 12) locks-on to a GPS satellite signal 16, the initial phase measurement is biased by an arbitrary number of whole cycles of the carrier frequency that is received by the antennae. The receiver has no way of determining just how many complete wavelengths (see FIG. 1 where the "integer ambiguity" is denoted as "n" at 20) are contained in the electromagnetic signal 16 stretching between receiver 12 and satellite 14. It is well known that, when taking carrier phase measurement, a value for the integer ambiguity must be determined (resolved) accurately so that the measured phase can be converted into a precise range (or distance) to the satellite. This, in turn, allows for accurate identification of a receiver's position. It is desirable to identify a position by, for example, giving its geographic coordinates or UTM coordinates which can then be mapped onto an electronic display showing the receiver's location within a city or region (such as a mountain range, desert region, and so on).

Under ideal conditions, the integer ambiguity can be resolved quickly. However, under ordinary, everyday circumstances biases and errors resulting from receivers and satellites, as well as tropospheric and ionospheric delays, make determination of the ambiguity (which tends to fluctuate with time) very complicated. Even traditional, well-known static differential GPS positioning, where the receiver remains in a fixed spot and is able to spend a relatively long time (i.e., an epoch of up to an hour or two) collecting uninterrupted phase measurements to isolate an integer ambiguity for a particular receiver-to-satellite range, requires significant processor computation time and effort.

The traditional static differential GPS positioning has been supplanted by more-productive so-called kinematic surveying, where the receiver is considered "in-motion" and allotted much less time at any one position to collect phase measurement data (an epoch of one minute or less). Kinematic differential positioning uses carrier phase observations or measurements to resolve the integer ambiguity—this is commonly referred to as "on-the-fly" determination of ambiguities. Known on-the-fly techniques can be lumped together as being deterministic in nature. That is to say, known GPS on-the-fly techniques resolve the ambiguity by testing many combinations of ambiguity sets that fit within a certain predefined and specifically constructed mathematical search space (defined in the ambiguity domain) or a predefined and specifically constructed physical search space (defined in a position domain). Although construction approaches of the predefined search space vary in known on-the-fly techniques, none take advantage of the wealth of information embedded within the GPS measurements collected.

Most such known on-the-fly techniques require the use of the more-expensive dual-frequency receivers with stable carrier phase tracking loops. However, these dual-frequency receivers must rely on a codeless correlation technique(s) to reconstruct the $L_2$ carrier signal. For example, Trimble Navigation Ltd.'s model 4000 SSE/SSi™ receiver uses a cross-correlation technique while Ashtech, Inc.'s model Z-XII/P-12 receiver employs a Z-TRACKING™ technique to reconstruct the full $L_2$ carrier wavelength. These $L_2$ carrier reconstruction techniques remain unproven under many operational conditions and have substantial degradation in the signal to noise ratio making it difficult to resolve ambiguities even when using these sophisticated dual-frequency receivers.

Hans Euler, in his 1994 IEEE paper presented at the Position Location and Navigation Symposium ("Achieving High-Accuracy Relative Positioning in Real-time: System Design, Performance and Real-Time Results"), reports of his success using real-time processing software on a Leica AG's WILD CR244™ GPS handheld controller (INTEL® 386-chip) that uses a recursive least-squares algorithm with pre-elimination of unknowns used for one epoch and single-difference modeling of the observations. During the initialization period, the algorithm delivers the actual computed position. The GPS sensor used was the Leica AG's WILD SR299™, a dual-frequency receiver with 9 channels for the $L_1$ phase and 9 channels for $L_2$ phase tracking that delivers 4 independent measurements (2 pseudo ranges and 2 phases) for every satellite. The pseudo ranges are measured using the C/A code on $L_1$ and the P code on $L_2$. If Anti-Spoofing is turned on, the pseudo range on $L_2$ is measured by using a proprietary P code aided tracking technique (see discussion of reconstruction of the $L_2$ carrier, above).

U.S. Pat. No. 4,812,991 issued to Hatch (1989) discloses a method and apparatus for determining the position coordinates of a remote, movable receiver relative to a fixed reference receiver that uses successive code measurements and carrier phase measurements of both the $L_1$ and $L_2$ carrier signals broadcast from four or more orbiting GPS satellites. Code measurements based on a weighted average of the individual $L_1$ and $L_2$ code measurements in each satellite/receiver link are adjusted in accordance with the corresponding carrier phase measurement for an $L_1$ and $L_2$ carrier difference signal and are further smoothed over time. It takes at least two to three minutes of processing to yield a position determination that is accurate to about 1 centimeter (cm).

U.S. Pat. No. 4,963,889 issued to Hatch (1990) discloses a complex time-consuming technique for resolving whole-cycle ambiguity. The relative position of a secondary receiving antenna with respect to a reference antenna is approximately known or approximately initially determined and then measurements from a minimum number of satellites are used to determine an initial set of potential solutions to the relative position of the secondary antenna that fall within a region of uncertainty surrounding the approximate position. Redundant measurements are taken from one or more additional satellites and used to progressively reduce the number of potential solutions to close to one. Even if the number of potential solutions is not reduced to one true solutions, the number can be further reduced by using additional measurements taken at different time intervals, at which different satellite geometries prevail.

Caroline Erickson in her "Analysis of Ambiguity Resolution Techniques for Rapid Static GPS Surveys Using Single Frequency Data" analyzes and compares three ambiguity resolution techniques (all based on double-difference observations) for rapid static GPS surveys over short baselines using single frequency data with C/A code measurements: the Ambiguity Function Method (AFM), the Fast Ambiguity Resolution Approach (FARA), and the Least Squares Ambiguity Search Technique (LSAST). She reports that the AFM differs from least squares techniques because trial positions are searched instead of trial ambiguity sets, which results in the unique property of AFM being invariant to cycle slips.

Patrick Y. C. Hwang in his 1990 IEEE paper "Kinematic GPS: Resolving Integer Ambiguities On The Fly" proposes two ideas for adapting standard kinematic techniques to situations that do not naturally allow for the constraint of a fixed baseline. The first calls for extracting the information needed to resolve the integer ambiguity from the data collected while the kinematic survey is in progress. The second idea addresses the use of the antenna exchange technique for mobile platforms where the original locations of the antennas are not likely to remain stationary during the physical exchange. Both ideas count on information from additional measurements to augment their respective measurement models.

It can be appreciated that, due to encryption and general unavailability of the P code and resulting unavailability of a direct $L_2$ carrier signal (reconstruction being necessary), plus the need/desire to cut computation time of the ambiguity resolution, known and currently available GPS static and kinematic positioning techniques are very limited in use. A robust on-the-fly GPS technique is needed that only has to rely on $L_1$ carrier phase measurements, as derived from the publically-accessible C/A code, using a single-frequency signal receiver (but could be used with an $L_1/L_2$ dual-frequency receiver). The innovative method, computerized device and system, described herein, has a wide range of static and kinematic (where the receiver only has a minute, or a few seconds, at any particular position to take measurements) positioning applications.

The innovative method of determining a value for an integer number of signal phases/cycles/wavelengths using the computerized device described herein, can collect the necessary data in a very short period and rapidly resolve an integer ambiguity without requiring substantial hardware changes to the components of known positioning systems Code for carrying out the method of the invention can be readily drafted and installed onto currently available positioning receivers having currently-available computer processing units (CPU) similar to those found in personal computers (PCs), workstations, laptop PCs, and handheld devices such as palmtop PCs.

Unlike the GPS devices and techniques currently available for resolving the integer ambiguity, the new method, device, and system were developed to utilize processing time more efficiently while at the same time provide sufficient or optimal solutions to resolution of the integer ambiguity without requiring close initial estimates of the ambiguity. More particularly, unlike known GPS methods and devices used for resolving the integer ambiguity, true initial ambiguity values are not required to resolve the integer ambiguity for positioning. In fact, initial ambiguity values need not be very close at all to optimally resolve the integer ambiguity using the new method, device, and system.

Additionally, unlike known GPS mathematical techniques developed such as Ambiguity Function Mapping method, AFM, (which, alone, relies on a deterministic trial and error procedure to compute each corner of a cubed search volume in an attempt to find a unique set of integer ambiguities), the new method, device, and system apply a collective learning process using a random, or probabilistic, search technique. As will be better appreciated, the flexible method, device, and system of the invention can be: incorporated into currently available GPS orbiting satellite transmitters and kinematic or static signal receiving hardware located on earth; used with transmitters and receivers that are either both in orbit or both located within the earth's atmosphere (such as on an aircraft); used with transmitters and receivers that are both located on earth (for example, the transmitter located on "high ground" such as on a hill top or on a mountain and the receiver installed in a traveling vehicle); and so on, in the spirit of the design goals for the instant invention.

SUMMARY OF THE INVENTION

It is a primary object of this invention to provide a method for determining a value for an integer number of phases using a computerized device that takes advantage of information components embedded in the code and carrier phase measurements. It is also an object of this invention that such a method provide a means of determining an optimal value that can be used for subsequent determination of a position of, for example, a GPS receiver. It is also an object of this invention to provide a computerized device for receiving a signal transmitted from a distant source, such as a GPS satellite, that includes a processor for determination of a value for an integer number of phases; and to provide a system for determining the position or location of, say, a GPS receiver.

The advantages of providing the innovative method, device, and system, as described herein, are: (a) A value for the integer ambiguity can be computed by a computerized device that receives the signal wave, processes the phase data collected and determines an optimal value within a very short time; (b) Simplicity—Signal wave phase measurements can be taken and the value can be computed using current computer processing technology, memory, and disk storage; (c) Design flexibility—The method of the invention can be used with a computerized device that is portable for on-the-fly positioning, or a device that is at an effectively-fixed location such as a UNIX-based workstation for static positioning; (d) Process and equipment cost reduction—The method is operational with single-frequency phase observations and the computerized device can incorporate a single-frequency receiver, thus reducing overall cost to determine positions (as single-frequency receiving equipment is generally less expensive than dual-frequency receivers); (e) Versatility—the method, device, and system can be used with dual-frequency phase observations collected using dual-frequency equipment; (f) The new method, computerized device, and system can be used in a wide variety of positioning/navigation/locating/tracking applications on newly-developed, and currently available, equipment; and (g) Having the ability to collect the necessary data in a very short period of time to rapidly determine an optimal value for the integer ambiguity, the method, device, and system are suitable in the following: Three-dimensional marine positioning systems used to locate harbors and docking facilities; machine guidance systems with the receiver mounted on construction, farm, or manufacturing equipment; and Intelligent Transportation Systems (ITS) built into vehicles and aircraft for navigation.

Briefly described, the invention includes a method for determining a value for an integer number of phases using a computerized device, having steps: (a) providing an initial set of at least two coded integer ambiguity strings; (b) based upon a computed fitness value for each string in the initial set, choosing a selected plurality of integer ambiguity strings; and, (c) using information components from at least a first and second string of this selected plurality, generating a first and second offspring ambiguity string for evaluation. This evaluation can include analyzing whether an optimal determination of the value has been made, such as, by analyzing an offspring fitness value computed for each offspring ambiguity string and/or by analyzing the offspring ambiguity strings, themselves. Additional steps that further distinguish the method of the invention from known methods, include: Prior to choosing, calculating a probability of selection in connection with each computed fitness value; and generating additional offspring ambiguity strings for which fitness values can be computed. The offspring ambiguity strings to comprise/constitute a second set from which a subsequent selected plurality of integer ambiguity strings are chosen. An optimal determination of the value can be used for subsequent determination of a position. The method of the invention can be incorporated into a global positioning system (GPS) that uses orbiting satellites for transmitting signal waves to a computerized device on earth for determining position.

The invention also includes a computerized device for receiving a signal transmitted from a distant source. The computerized device, which can be made portable for receiving signals while the device is traveling from one point to another point (kinematically), has a processor for determining a value for an integer number of phases. The process for the determination of a value, includes steps that patentably distinguish the device of the invention from known devices: providing an initial set of at least two coded integer ambiguity strings; choosing a selected plurality of integer ambiguity strings from the initial set; and, using information components from at least a first and second string of this selected plurality, generating a first and second offspring ambiguity string for evaluation. This evaluation includes analyzing whether an optimal determination of the value has been made, such as, by analyzing an offspring fitness value computed for each offspring ambiguity string and/or by analyzing the offspring ambiguity strings, themselves. One can add the step of, prior to choosing, computing a fitness value from which a probability of selection can be calculated for each string in the initial set. The step of generating a first and second offspring ambiguity string can include concatenating certain of the information components from strings in the initial set and mutating at least one bit in each resulting concatenated offspring ambiguity string.

Also characterized herein, is a system for determining a position having a source for transmitting a signal wave and a computerized device, located a distance from the source. The computerized device has a signal wave receiver and a processor for determining a value for an integer number of phases that patentably distinguishes the device and system of the invention from known positioning system components. The determination of a value, as disclosed herein, can include up to hundreds and thousands of iterations of generating offspring strings before making an optimal determination of the value. The system can be a global positioning system (GPS) that uses a satellite in orbit, or other distant source, to transmit signals for the purpose of determining the position of a device used to receive the signals.

BRIEF DESCRIPTION OF THE DRAWINGS

The invention will be more particularly described by referencing the accompanying drawings of the preferred embodiments, in which like numerals designate like parts.

DETAILED DESCRIPTION OF THE PREFERRED EMBODIMENTS

In order to compute the position of a GPS receiver (see, FIG. 1) based upon the ranging information available from either GPS code tracking (i.e., "pseudorange") measurements or carrier phase measurements 18, the positions of the remote transmitters (e.g., a GPS satellite in orbit) from which measurements are taken, must be known. In GPSs, the information necessary for determining each satellite's position is superimposed on the $L_1$ and $L_2$ carriers along with the C/A and P codes. Each satellite, such as the one represented at 14, broadcasts a unique message consisting of orbital information, offset from GPS time of the satellite clock, and information on health of the satellite. There is a wide variety of GPS receivers currently available for portable static, portable on-the-fly (kinematic), and stationary positioning applications for use with GPS orbiting satellites.

Figure 1:
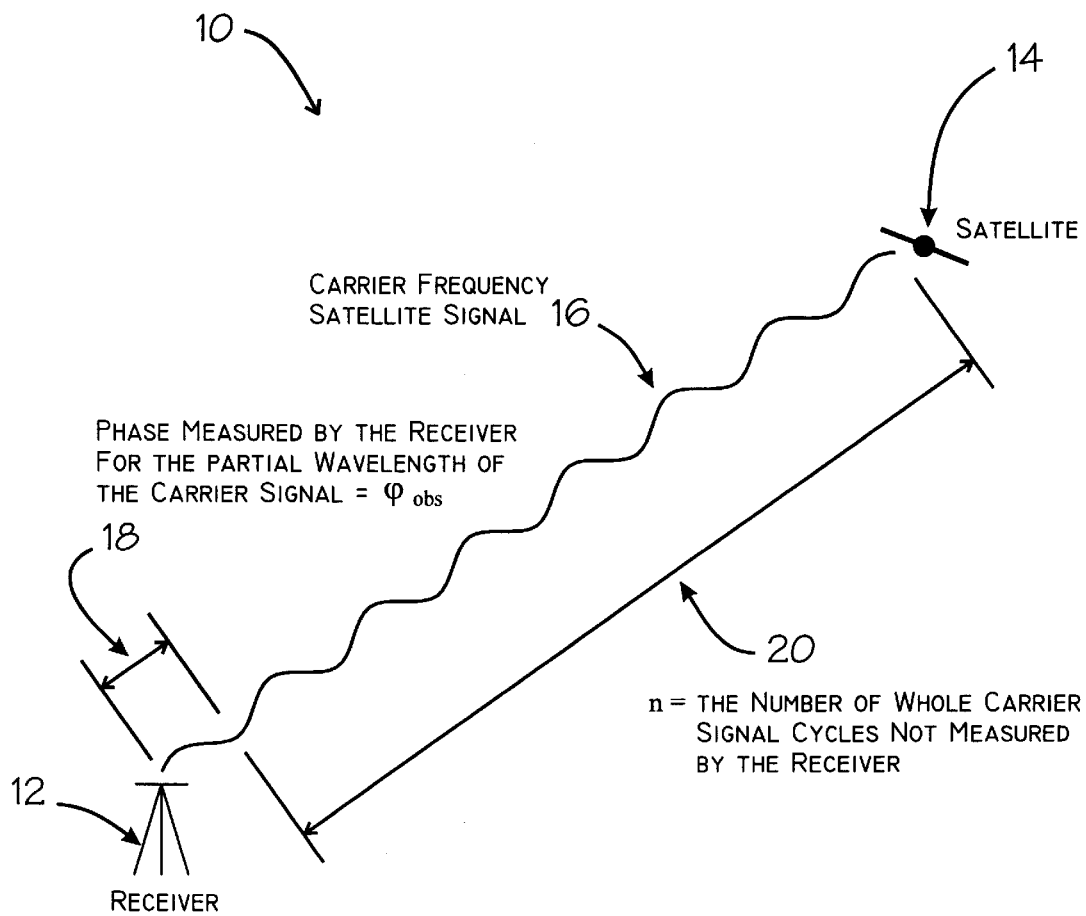
FIG. 1 is a schematic representing the transmission of an electromagnetic signal wave (such as an $L_1$ or $L_2$ GPS "carrier" signal) from a distant source, such as a GPS satellite, to a receiving device located, for example, on earth.

In determining the carrier phase integer ambiguity denoted n in FIG. 1, assuming only two receivers (a,b) and two satellites (j,k) are involved, the basic observation equation for a double-difference positioning solution is known:

$$\phi^{jk} = \frac{1}{\lambda}\rho_{ab}^{jk} + n_{ab}^{jk} + \varepsilon^{jk} \quad \text{(Eqn. 1)}$$

The n term, since it is a linear combination of four separate integer ambiguity values, represents the double-difference integer ambiguity. To obtain an integer or "fixed" solution for n requires solution of the following known minimization problem:

$$\min_n (\hat{n}-n)^T Q_{\hat{n}}^{-1}(\hat{n}-n) \text{ with } n \in Z^m \quad \text{(Eqn. 2)}$$

To efficiently solve Equation 2, one must minimize computation time while using as few epochs of phase observations as possible (preferably, only one epoch): Research done by others has attempted to do so.

Of the several known deterministic techniques developed for resolving the integer ambiguity in GPS, Ambiguity Function Mapping (AFM), was developed in the early 1980's. It was later applied (the early 1990's) in the position domain to kinematic GPS positioning as an on-the-fly technique that requires good initial coordinates of the unknown point to establish a reasonable search space. Integer ambiguity values that are computed with AFM using the double-difference Equation 1, above, can be used to determine a receiver's position. However, AFM is not very popular since its very heavy computational burden makes it a very inefficient technique. Also, AFM does not use valuable information available from either the code correlation or successive epochs of the carrier phase measurements. AFM is based on the degree of agreement between measurements from several satellites.

Also currently used is the Least Squares Search method which yields a measure of the disagreement between measurements. Unlike AFM, a Least Squares Search for an ambiguity is done in the mathematical domain. Two later known methods that spring from the Least Squares Search include: Polynomial Identification (1994); and in 1995, the Least Squares Ambiguity Decorrelation Adjustment method (LAMDA).

The method, device, and system of the invention, unlike any other method presented, employ random/probabilistic concepts and use of knowledge accumulated in a prior "generation" population of integer values, such as those found in the mathematical optimization sub-topics identified as Genetic and Evolutionary Algorithms (G/EAs). G/EAs, as the name indicates, are based on natural evolution of living things. The flow diagram in FIG. 2 represent the basic structure 22 of a genetic/evolutionary algorithm as discussed in Part B (*Selected Computational Methods*), the *Mathematical Optimization* subchapter, incorporated herein by reference, from the on-line (INTERNET) Computational Science Education Project "e-book" sponsored by the Dept. of Energy.

Prior work in the area of G/EAs (called "Methods of Last Resort" in the e-book) identified that complicated nonbiological structures could be described by simple bit strings ("chromosomes") and that these structures could be improved by the application of simple transformations to those strings. Step 25 in FIG. 2, Select Population from Prior Population, selects members from the prior population (first-off, that is the Initial Population 24) that are allowed to reproduce: A probability of a particular member-solution's survival to the next-generation population is first calculated—this probability of survival is proportional to a fitness (objective value) of that particular member-solution; then, randomly, using simulated (using a known algorithm) spins of a suitably weighted, roulette wheel "N" number of times, member-solutions are selected from the current population based upon that particular member-solution's probability of survival to the next-generation population. Of course, the Initially-generated Population 23, after it has been Assessed (at 24), is the Population from which the reproducing parent-solutions for the next (second) generation population is selected.

Figure 2:
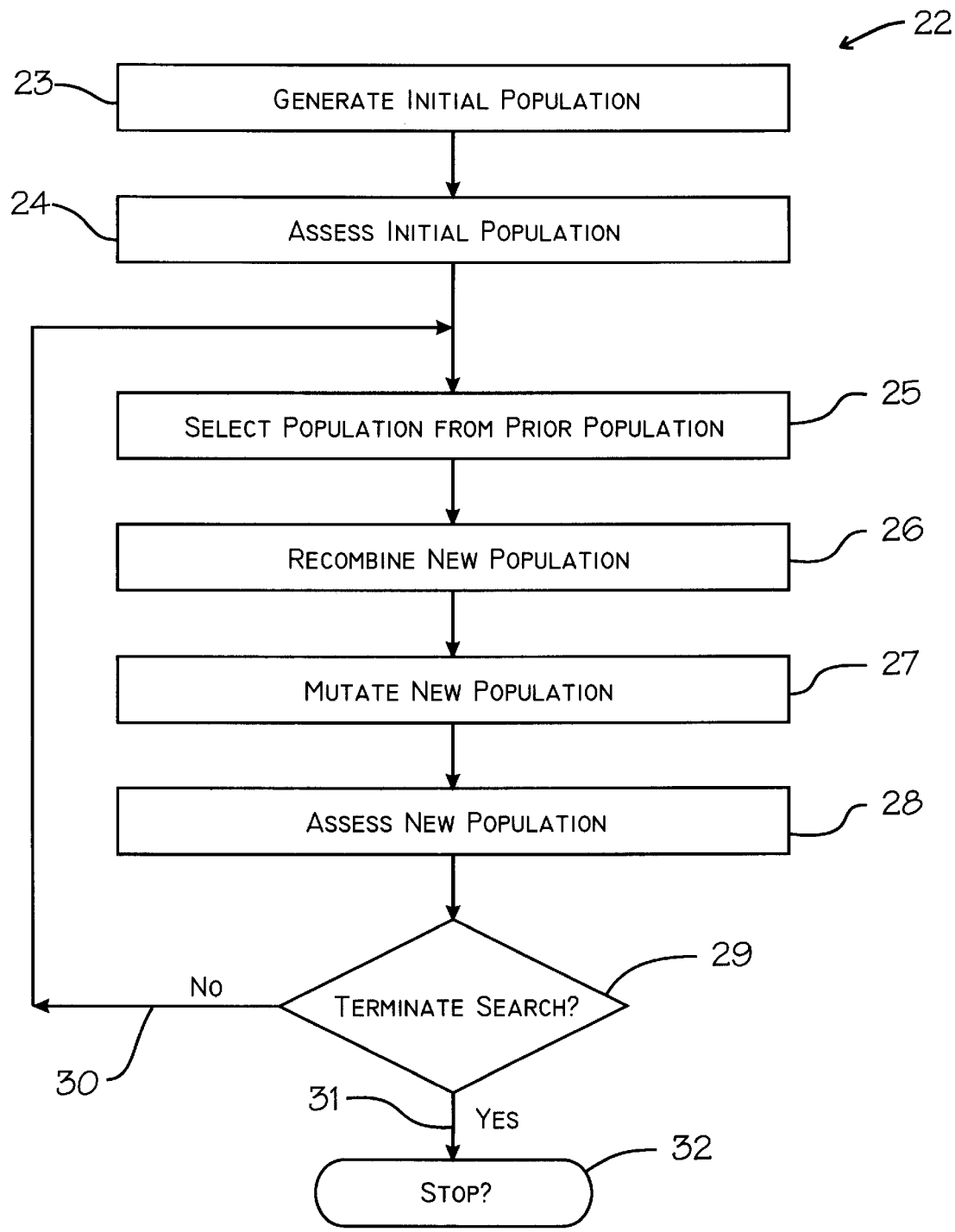
FIG. 2 is a flow diagram representing the basic structure of a genetic/evolutionary algorithm (G/EA) as discussed in Part B (*Selected Computational Methods*), within the *Mathematical Optimization* subchapter, incorporated herein by reference, from the on-line (INTERNET) Computational Science Education Project "e-book" sponsored by the U.S. Department of Energy.

Next, the FIG. 2 step to Recombine New Population 26 is performed to create new, improved solutions—a key feature being that of a "crossover" operation in which the G/EA seeks to construct better member-solutions by using a probability of crossover, $P_C$, to combine the features of good existing member-solutions. In nature, an offspring population-member is rarely an exact clone of one parent, and instead inherits genes from both parents. The G/EA attempts to replicate this natural phenomenon by a mathematical crossover operation. The simplest form of crossover is one point crossover. Two-point crossover is where two crossover points are randomly selected and the substrings between (and including) those positions are exchanged.

The next step identified in FIG. 2 to Mutate New Population 27 is introduced in a G/EA to maintain diversity within the population by "flipping a coin" (using a probability of mutation $P_M$) for each bit in a member-solution string on which crossover has been performed, to change bit values (for example, if a crossover produced a 111111 string, no new solutions would be introduced by that string if it was not mutated).

Regarding the step to Assess New Population 28: G/EAs do not use derivative information; instead, prior to any selection for reproduction, each offspring member-solution of each population is supplied with a normalized fitness value from which that offspring member's probability of survival is calculated (see Select Population 25). The decision whether to Terminate Search 29 along the YES path 31 to Stop 32, or take the NO path 30 to return to Select Population 25 to choose the reproducers of the next population, depends upon the results of the Assessment 28. An objective function is optimized in order to find a fitness function "F" that can properly evaluate each G/EA member-solution's survival. In general, those member-solutions that have a higher than average fitness value will produce more than one offspring member, while those with below average fitness will produce less than one offspring. Infeasible member-solutions are "rejected" by not being selected as a parent for the next generation (rejection is simulated in the G/EA by allocating a zero survival probability to a rejected member).

Figure 3:
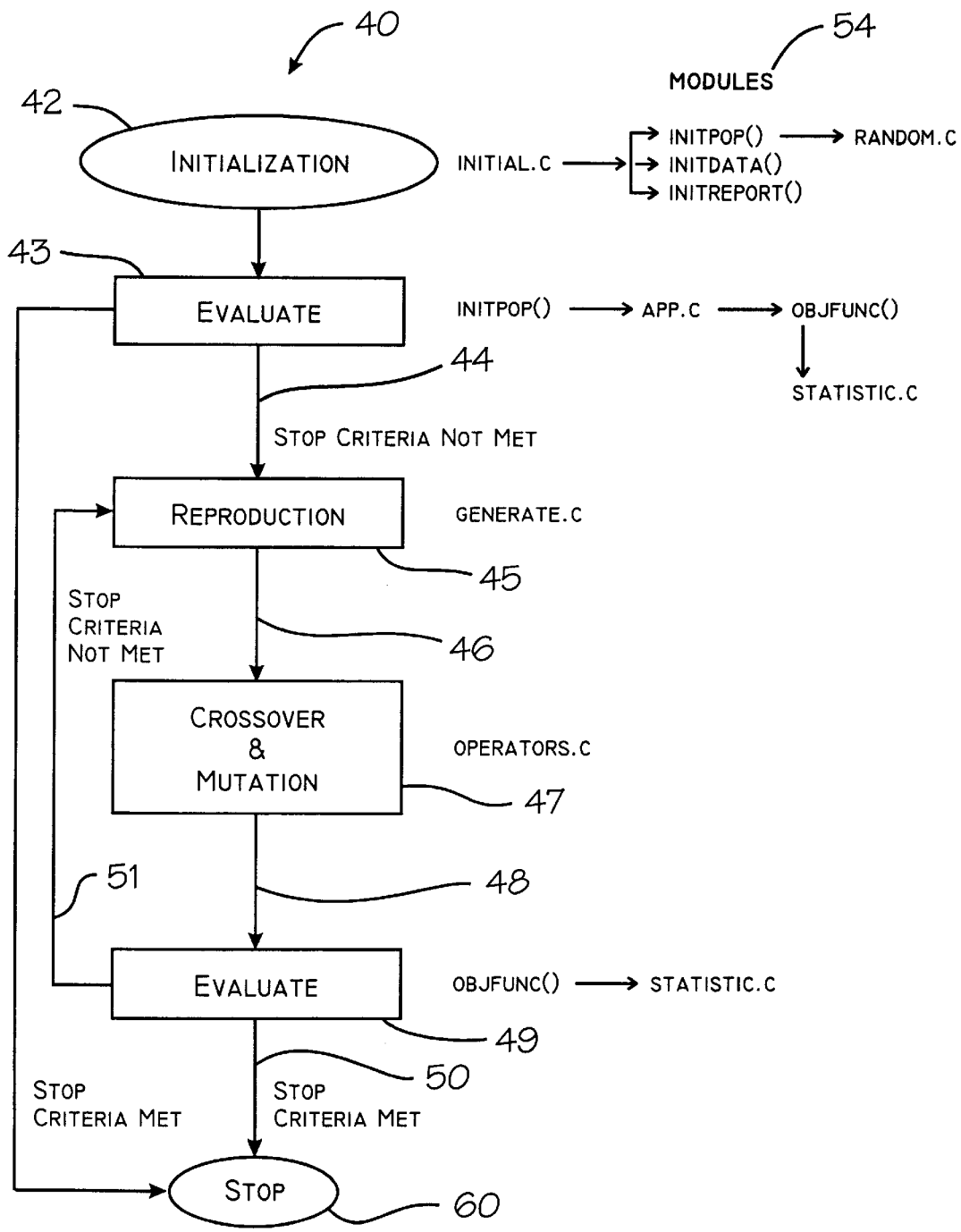
FIG. 3 is a flow diagram representing preferred method of the invention.

Turning to the flow diagram of FIG. 3, the method represented at 40 embodies a preferred method of the invention, as well as a preferred process for determination of a value for an integer number of phases used in the computerized device and a preferred system of the invention. As mentioned, unlike other ambiguity resolution techniques (especially where a search volume must be initially defined), the method of the invention need not have good initial estimates of the integer ambiguity values as no "volume" is searched. Therefore, initial estimates (at 42) of the ambiguity values can be done using a random number generator. By way of example, and used only for the purposes of discussion and reference herein, "MODULES" 54 have been identified in FIG. 3.

To begin, in INITIALIZATION 42, one can invoke any of the known random generators. In the new combination disclosed herein, a random generator based on the known portable subtractive pseudo random number generator of Knuth (1981) was chosen, particularly adapted for use, and is identified as "random.c". The module random.c uses an arbitrarily-picked seed to generate a sequence of initial ambiguity values (each initializing seed will typically result in the generation of a different random sequence, or in different starting point within the same long sequence). In random.c, the same initializing seed always returns to the same random sequence. First, a call is made to the function "randomize( )" which reads the arbitrarily-picked seed input by the user. Then, a call is made to a function "warmup . . . " to initialize the random number generator. And a new batch of 55 random numbers is generated using another subroutine "advance . . . ". If populations consisting of N=8 ambiguity sets are needed, then only 8 of the 55 random numbers generated will be used. Below is an example of two different sequences of 8 random numbers generated random.c using seed 0.3:

TABLE 1

| Ambiguity Set | Random Number | Ambiguity Set | Random Number |
|---|---|---|---|
| 0 | 807110 | 0 | 3228440 |
| 1 | 246954 | 1 | 3951266 |
| 2 | 132617 | 2 | 98886 |
| 3 | 98377 | 3 | 18934 |
| 4 | 1008399 | 4 | 802243 |
| 5 | 462367 | 5 | 2225922 |
| 6 | 459438 | 6 | 2860758 |
| 7 | 636341 | 7 | 3477521 |

Once initial population values are chosen, they are converted into binary coding (using well known principles of conversion from base-10 numbers into binary strings). Consider the sample observations taken from four GPS satellites (satellite vehicles, or "SVs") SV7, SV6, SV12, and SV33, with initial ambiguity values as shown in Table 2A (below). Using SV7 as the reference SV for computing the double-difference observations and, therefore, three double-difference integer ambiguities (corresponding to Initial Ambiguity in Table 2A) must be resolved. As shown in Table 2B, after each Initial Ambiguity value is converted into a 22-bit binary string, they can be concatenated to form one long 66-bit string. This 66-bit string can represent an initial trial solution (one alternative among the $2^{3*22}=2^{66}$ possible combinations). Concatenation of several three double-difference ambiguity sets can be done to create a population of $N_{set}$ strings.

TABLE 2A

Example double-difference initial ambiguities.

| Satellite Pair | Initial Ambiguity |
|---|---|
| SV# 7-6 | 3228440 |
| SV# 7-12 | 18934 |
| SV# 7-33 | 3477521 |

TABLE 2B

Example binary coding of three initial ambiguities.

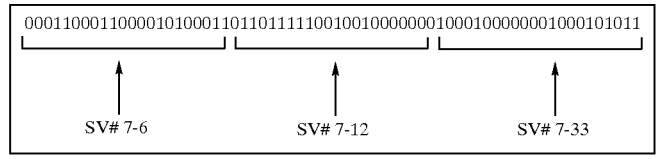

The initial population of, say, 8 integer ambiguity values is EVALUATEd (step represented at 43) by determining the fitness function value for each of the 8 values (accomplished by module "app.c" which contains "objfunc( )" that actually computes each fitness value $F_i$). For the invention, an objective function had to be chosen carefully for optimization so that a successful judgment can be made by the method whether new ambiguity solutions were getting better. The objective function used in this example, was derived from the Ambiguity Function Mapping method (AFM). AFM (which relies solely on trial and error as mentioned above) has been avoided in commercial GPS ambiguity resolution applications largely due to its heavy computational burden. A modified version of the AFM objective function used here, that will be maximized, is:

$$A(\hat{n}_i) = \sum_{i=1}^{m} \sum_{j=1}^{p-1} \cos\{2\pi[\phi_{obs}^{mp}(n) - \phi_{com}^{mp}(\hat{n})]\} \quad \text{(Eqn. 3)}$$

To map the objective function so that a high F value corresponds to a high $A(\hat{n})$ value and also to avoid negative F values, the following fitness function was adopted:

$$F_i = 1/[(A_{max} + A_{min}) - A_i] \quad \text{(Eqn. 4)}$$

where i indicates the $i^{th}$ iteration, and $A_{max}$ and $A_{min}$ are the maximum and minimum values of Equation 3 for a population set, respectively.

The next generation is created from the initial population $N_O$ by a probabilistic selection process. G/EAs use a selection scheme that generate new candidate member-solutions based upon probability of survival; that probability of survival is dependent upon the fitness value $F_i$ of the string structure. One can appreciate that, string structures that have a high fitness value (i.e., where its calculated $F_i$ is close to unity, or, "1.0") may be selected several times for reproduction and string structures that have a low fitness value may never be selected to reproduce. Here, a probability of selection of a particular ambiguity bit string in a population is computed using the following:

$$P_r = \frac{F_i}{\sum_{i=1}^{N} F_i} \quad \text{(Eqn. 5)}$$

Because of the limited sample size provided by the initial population $N_O$ (for the instant method, device, and system of the invention, decided to likely be between 2 and 30), $P_r$ as given in Equation 5, has a tendency for bias toward particular candidate member-solution strings. Therefore, some form of randomization must be included in the REPRODUCTION step (FIG. 3 at 45). This is especially important in the first few population iterations because, in this novel application to use certain borrowed G/EA concepts to resolve an integer ambiguity, without an element of randomization, a few "super ambiguities" could take over and reduce population diversity, early in the process.

G/EAs incorporate a roulette wheel selection process to implement proportionate reproduction. Each candidate member-solution string is allocated a roulette wheel slot with the angle at the center of the wheel, subtended by the slot, equal to $2\pi P_r$. A particular candidate member-solution string will be allocated an offspring if a randomly generated number, in the range 0 to $2\pi$, falls in the slop corresponding to that string. In this manner, roulette wheel selection chooses strings until it has generated the entire population of the next generation. In FIG. 3, this module has been identified as generate.c. Although REPRODUCTION 45 will select the "most-fit" candidate member-solutions for the next operation, REPRODUCTION 45 creates no new strings.

After the most-fit candidate member-solutions have been selected (step 45) from the initial population set, the module identified as "operators.c", found next to the box 47 CROSSOVER & MUTATION, performs important steps in the preferred method to determine a value for the integer ambiguity. First, parent-string pairs of the selected (step 45) strings are randomly chosen to be subjected to CROSSOVER: This is applied with a preselected probability of crossover, $P_c$ (preferably $P_c$ is from 0.5 to 1.0). The CROSSOVER process takes valuable information components from both parent-strings and combines them to produce a "highly-fit" offspring ambiguity value. The simplest known form of crossover involves swapping corresponding bit-segments (containing one or more successive bits) of the two binary strings representing the parents. Of the wide variety of approaches, a technique known as single-point crossover is preferred. If length of a selected ambiguity string is "l", a crossover point is randomly chosen in the range [1, 1−1]. The portions of the two parent-strings beyond this crossover point are interchanged to form two new offspring strings. With equal probability, the crossover point may be any one of the l−1 possible locations of each parent-string. However, to control the frequency with which a crossover operator is applied, before crossover is performed on a pair of parent-strings, preferably, a number (between 0 and 1) is randomly generated and compared with a preselected crossover rate $P_c$.

Figure 4:
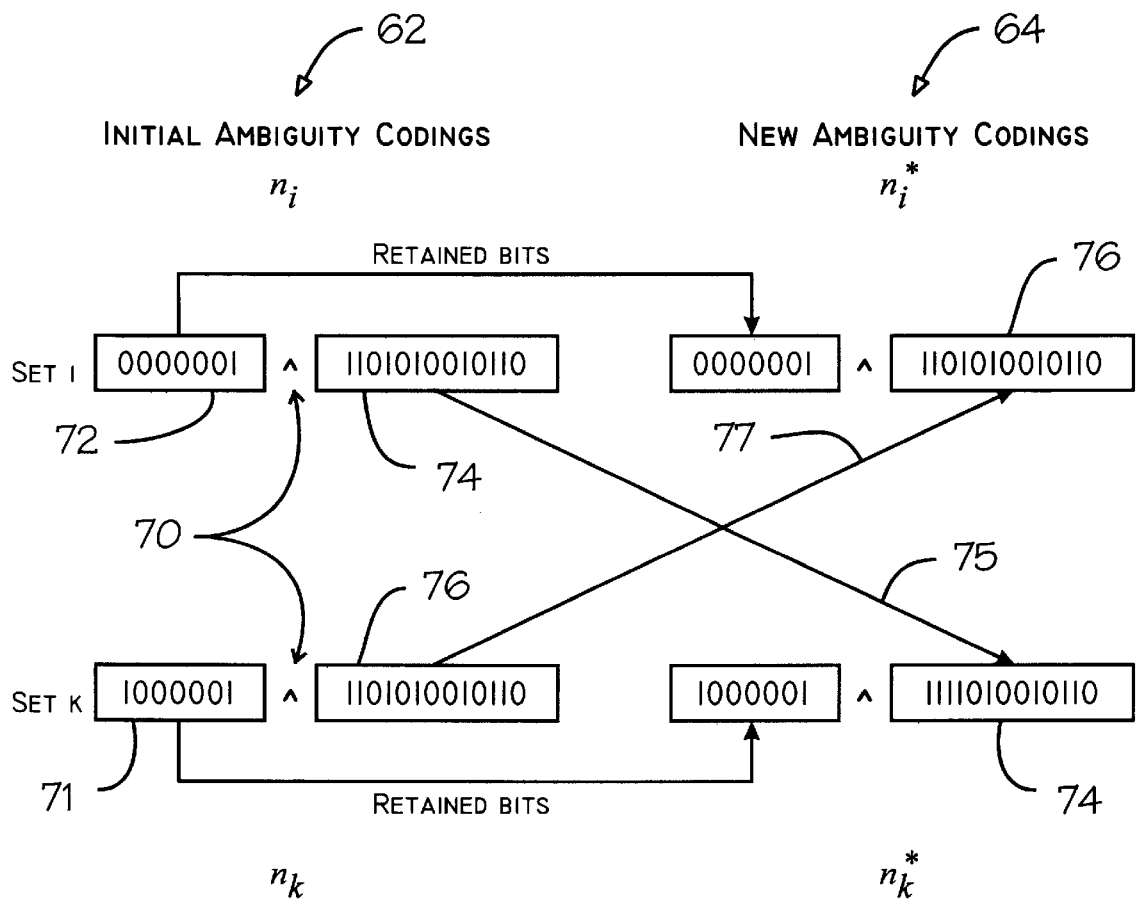
FIG. 4 is a simple schematic providing more detail of a preferred CROSSOVER operation using two parent sets of coded ambiguity values.

An illustration of CROSSOVER is shown in FIG. 4. In connection therewith, Table 3 includes GPS satellite vehicle (SV) information based on a three double-difference ambiguity search for a four GPS SV configuration, each SV pair has a population set i and k. First, a crossover point is randomly chosen (using, for example, a roulette wheel mechanism to select the $7^{th}$ bit, labeled 70) at which to swap portions of original ambiguities $n_i$ and $n_k$ (labeled 62) to produce new ambiguities $n_i^*$ and $n_k^*$ (labeled 64) for the next iteration. The first 7 bits ("0000001" labeled 72) of the original ambiguity $n_i$ is preserved for new ambiguity $n_i^*$. The next 13 bits of $n_i$ (labeled 74) are swapped (arrows 75, 77) with the last 13 bits of original ambiguity $n_k$ (labeled 76) to form $n_i^*$. Likewise, new ambiguity string $n_k^*$ is generated by retaining the first 7 bits ("1000001" labeled 71) and combining it with the last 13 bits of original ambiguity $n_i$ (74 along arrow 75). In each new population of member-solution strings, $P_c^* N$ string structures will undergo CROSSOVER. As one can appreciate, the higher the crossover rate $P_c$, the more quickly new string structures will be introduced into a new population.

TABLE 3

Binary coding of ambiguities for a four satellite configuration.

| Satellite Pair | Population Set | Ambiguity | Binary Coding |
|---|---|---|---|
| SV# 2-7 | i | 431 550 | 00000011101010010110 |
|  | k | 431 425 | 10000011101010010110 |
| SV# 2-15 | i | 454 520 | 00011110111101110110 |
|  | k | 454 524 | 01101110111101110110 |
| SV# 2-26 | i | 155 356 | 10111011011110100100 |
|  | k | 155 340 | 10111011011110100100 |

Next, returning to FIG. 3, the operation of MUTATION (in box 47) is performed to increase the variability of the population. The G/EA mutation process was designed and added to crossover to simulate the natural introduction of new information into a population of offspring member-solution strings (in the form of switching a selected bit/bits to an opposite value—from 0 to 1, or vise versa). As novelly applied to the method, device, and system of the invention, MUTATION helps avoid the possibility of mistaking a local maximum for the global maximum (optimized value) that is sought. G/EAs use a mutation probability $P_m$ applied bit-by-bit to determine whether or not each particular bit in a member-solution string should be switched to its opposite value. For each bit, a uniformly distributed random number in the range [0.00, 1.00] is generated and compared to a preselected $P_m$.

Table 4 illustrates the MUTATION of the eighth bit (shaded) as applied in the SV# 2–7 set i ambiguity 20-bit string from Table 3. The $n_i$ and $n_i^*$ are the original and new strings after the binary 1 (shaded) of original string $n_i$ is mutated to 0 to form a new string $n_i^*$. Approximately $P_m^*N^*20$ mutations will occur per generation in this example. Generally, $P_m$ is a very small probability, preferably from 0.0001–0.7.

TABLE 4

One bit mutation process.

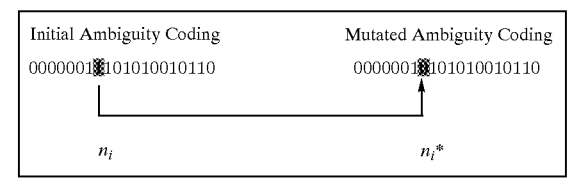

The simple pseudo-code, below, illustrates the operations set forth in FIG. 3: INITIALIZATION 42, EVALUATE 43, REPRODUCTION 45, CROSSOVER & MUTATION 47, and EVALUATE 49.

```
t = 0;
initialize N(t);
evaluate A(n) at N(t);
while (not termination condition)
{
t = t + 1;
reproduction N(t) from N(t - 1);
crossover N(t);
mutate N(t);
evaluate A(n) at N(t);
}
```

Referring, again, to FIG. 3, the routines identified, for reference only, perform the following: initpop( ) randomly initializes the initial ambiguities set calling random number generator random.c (see description above); which in turn, creates a sequence of, for example, N=8 chosen random numbers dependent upon a seed provided by initdata( ). These eight randomly generated numbers serve as initial ambiguities in a preferred method, device, and system of the invention. The initdata( ) routine provides initialization of input data such as the epoch number, satellite information, binary string length "l", preselected crossover and mutation probabilities $P_c$ and $P_m$, size of population set, maximum iterations of the method, and a seed for the random number generator. If desired, a routine such as initreport( ) can be included to write search parameters (such as binary string length "l", probabilities $P_c$ and $P_m$, and so on) to an output file into which results of individual iterations will be contained.

After initial population ambiguity sets have been initialized, an initial evaluation can be done for the initial ambiguity set using fitness values (preferably, although not necessarily, derived from the AFM objective function using Equations 3 and 4, above). Throughout the preferred method, the number of trial ambiguity strings remains fixed (by way of example, the number of strings remains at N=8). The initial evaluation of the initial set can be done within initpop( ), by calling routines from the app.c module to evaluate a fitness value calculated for each ambiguity in the initial set. The initial fitness values from the first iteration of the preferred method, are passed to REPRODUCTION, and so on, along arrows 44 and 46. Once a new generation (second set) of ambiguity strings has been created using CROSSOVER and MUTATION, following along arrow 48, the newly generated offspring ambiguity values are "EVALUATEd" (at 49). Here, preferably, a fitness value is calculated for each offspring value (using, for example, a routine identified as objfunc( ) as used in the earlier EVALUATE 43) for analysis to determine whether an optimal value for the integer ambiguity has been reached.

Under EVALUATE 49, offspring values can be compared to determine if each of the eight values are all the same value. If so, Stopping Criteria is met, and following along arrow 50, the preferred method ends. If the eight offspring values are not all the same value, a second criteria can be employed: Comparing a fitness value calculated for each of the eight offspring ambiguity values, with the fitness values calculated for the immediately-preceding population ambiguities, N(t–1), to determine if the later fitness values have changed substantially moving in the desired direction of unity (i.e., $F_i$ values are moving closer to unity). If a substantial change in fitness value has been made, and/or a majority or all the fitness values are not close to unity (meaning that it is unlikely an optimal value has been reached), then following arrow 51, the preferred method returns to REPRODUCTION 45 to select (as described above) candidates from each newly generated population (i.e., the second set of values, third set, fourth set, fifth set, and so on, until a final iteration produces an optimal value and the method STOPs at 60), to reproduce the next offspring by CROSSOVER & MUTATION. Additionally, one might choose to employ an external criterion (at EVALUATE 49) to determine whether an optimal value has been reached. For example, determination of a value for the integer ambiguity could be made using initial population values (INITIALIZATION 42) generated for a subsequent epoch (or several subsequent epochs) of phase observations. The subsequent epoch determinations can, then, be compared with the optimal values reached using data from preceding epochs, to confirm the optimal value.

Implementations of the new method, device, and system of the invention described herein, confirm that the invention yields surprisingly accurate results. An example has been done to compare results from the preferred method, device, and system of the invention, to a "true" 3 km baseline double-difference ambiguity (resolved, using 495 epochs of measurements available, as equal to the integer 454530). The GPS data set was collected for a 3 km baseline (i.e., the distance between a reference base station receiver and the positioning receiver): Only $L_1$ carrier phase data was used and collected at 15 second intervals using Trimble Navigation, Ltd.'s TRIMBLE 4000™ series SSE geodetic GPS receivers Using $N_{set}$ of 8, $P_c$ value of 0.5, and $P_m$ of 0.0009, the preferred method was used with a UNIX-based workstation. Eight initial ambiguity values were generated with INI- TIALIZATION 42, then EVALUATEd 43, and since Stop Criteria was not met (it is unlikely, although not entirely impossible, that randomly generated initial values will yield optimal values), REPRODUCTION 45, CROSSOVER & MUTATION 47, and re-EVALUATE 49 were performed using two internal validation criteria: (1) STOP when all eight values are the same, and if not all the same, (2) STOP when the fitness values are at a maximum value compared to the fitness values of previous population. Then, a subsequent epoch of measurement was used to check accuracy of results from the first. Table 5 illustrates that within the first three iterations of the preferred method, a fast convergence is made toward an optimal value. Tables 6 and 7 provide details for each of the eight sets (Ambiguities set 0 through Ambiguities set 7) after, respectively, the Initial Iteration of the preferred method and the Final/7661$^{th}$ Iteration. In the Final/7661$^{th}$ Iteration, all but one (Ambiguities set 4) value reached 454529. Table 8 provides details for each of the eight sets (Ambiguities set 0 to 7) for the Final/6364$^{th}$ Iteration of Epoch 2 Measurements, wherein all Ambiguities set values reached 454530 (i.e., the "true" ambiguity as resolved using 495 epochs of measurements for the 3 km baseline). Table 9 gives a summary for four epochs of Measurements illustrating that, in this example, just over 2 seconds of CPU processing (UNIX-based workstation) time was used to reach the optimal value.

Although the discussion of the novel method, device, and system of the invention has been focused by way of example on methods and components of the popular, well developed GPS, the invention has wider applications and need not be limited as such. The new, flexible method, device, and system of the invention can be: incorporated into currently available GPS orbiting satellite transmitters and kinematic or static signal receiving hardware located on earth; used with transmitters and receivers that are either both in orbit or both located within the earth's atmosphere (such as on an aircraft); used with transmitters and receivers that are both located on earth (for example, the transmitter located on "high ground" and the receiver installed in a vehicle); and so on.

While certain representative embodiments and details have been shown for the purpose of illustrating the method, computerized device, and system of the invention, those skilled in the art will readily appreciate that various modifications may be made to the invention without departing from the novel teachings or scope of this invention. Accordingly, all such modifications are intended to be included within the scope of this invention as defined in the following claims. In the claims, any means-plus-function clauses used are intended to cover the structures described herein as performing the recited function and not only structural equivalents but also equivalent structures.

TABLE 5

Iteration 1, 2 and 3 of Epoch 1 for the 3 km Solution

| Ambiguity Set | Iteration 1 Ambiguities | Iteration 2 Ambiguities | Iteration 3 Ambiguities |
|---|---|---|---|
| 1 | 807110 | 462367 | 462511 |
| 2 | 246954 | 462367 | 459295 |
| 3 | 132617 | 807367 | 459439 |
| 4 | 98377 | 246950 | 462366 |
| 5 | 1008399 | 459439 | 462366 |
| 6 | 462367 | 462366 | 462367 |
| 7 | 459438 | 462367 | 459438 |
| 8 | 636341 | 459438 | 462367 |

TABLE 6

Initial Iteration of the 3 km Baseline

| num | Iteration 0 string | fitness | Iteration 1 string | fitness |
|---|---|---|---|---|
| 1) | 01100011000010100011 | 0.180269 | 11111000011100001110 | 0.256765 |
| 2) | 01010101001000111100 | 0.188069 | 11111000011100001110 | 0.256765 |
| 3) | 10010000011000000100 | 0.181562 | 01010011000010100011 | 0.180269 |
| 4) | 10010010000000011000 | 0.180127 | 01100101001000l11100 | 0.188069 |
| 5) | 11110000110001101111 | 0.174112 | 11110101010000001110 | 0.270876 |
| 6) | 11111000011100001110 | 0.256765 | 01111000011100001110 | 0.256769 |
| 7) | 01110101010000001110 | 0.270883 | 11111000011100001110 | 0.256765 |
| 8) | 10101101101011011001 | 0.190127 | 01110101010000001110 | 0.270883 |

Iteration 0 Accumulated Statistics:
Total Crossovers = 2, Total Mutations = 0
min = 0.180269 max = 0.270883 avg = 0.242145 sum = 1.937161
Global Best Ambiguilles Set so far, Iteration 0:
Fitness = 0.270883: 01110101010000001110

Ambiguilles set 0 = 807110
Ambiguilles set 1 = 246954
Ambiguilles set 2 = 132617
Ambiguilles set 3 = 98377
Ambiguilles set 4 = 1008399
Ambiguilles set 5 = 462367
Ambiguilles set 6 = 459438
Ambiguilles set 7 = 636341

TABLE 7

Final Iteration of the 3 km Baseline for Epoch 1

| num | Iteration 7661 string | fitness | Iteration 7662 string | fitness |
|---|---|---|---|---|
| 1) | 10000001111101110110 | 0.970624 | 10000001111101110110 | 0.970624 |
| 2) | 10000001111101110110 | 0.970624 | 00100001111101110110 | 0.988221 |
| 3) | 10000001111101110110 | 0.970624 | 10000001111101110110 | 0.970624 |
| 4) | 00000001111101110110 | 0.935461 | 10000001111101110110 | 0.970624 |
| 5) | 10000001111101110110 | 0.970624 | 10000001111101110110 | 0.970624 |
| 6) | 10000001111101110110 | 0.970624 | 10000001111101110110 | 0.970624 |
| 7) | 10000001111101110110 | 0.970624 | 00000001111101110110 | 0.935461 |
| 8) | 10000001111101110110 | 0.970624 | 10000001111101110110 | 0.970624 |

Iteration 7661 Accumulated Statistics:
Total Crossovers = 15284, Total Mutations = 1107
min = 0.970624 max = 0.988221 avg = 0.966229 sum = 1.958845
Global Best Ambiguilles Set so far, Iteration 7661:
Fitness = 0.988221: 00100001111101110110

Ambiguilles set 0 = 454529
Ambiguilles set 1 = 454529
Ambiguilles set 2 = 454529
Ambiguilles set 3 = 454528
Ambiguilles set 4 = 454529
Ambiguilles set 5 = 454529
Ambiguilles set 6 = 454529
Ambiguilles set 7 = 454529

TABLE 8

Final Iteration of Epoch 2 Measurements

| num | Iteration 6364 string | fitness | Iteration 6365 string | fitness |
|---|---|---|---|---|
| 1) | 01000001111101110110 | 0.810551 | 01000001111101110110 | 0.810551 |
| 2) | 01000001111101110110 | 0.810551 | 01000001111101110110 | 0.810551 |
| 3) | 01000001111101110110 | 0.810551 | 00000001111101110110 | 0.847596 |
| 4) | 01000001111101110110 | 0.810551 | 01000001111101110110 | 0.810551 |
| 5) | 01000001111101110110 | 0.810551 | 01000001111101110110 | 0.810551 |
| 6) | 01000001111101110110 | 0.810551 | 01000001111101110110 | 0.810551 |
| 7) | 01000001111101110110 | 0.810551 | 01000001111101110110 | 0.810551 |
| 8) | 01000001111101110110 | 0.810551 | 01000001111101110110 | 0.810551 |

Iteration 6364 Accumulated Statistics:
Total Crossovers = 12713, Total Mutations = 933
min = 0.810551 max = 0.847596 avg. = 0.810551 sum = 2.468697
Global Best Ambiguilles Set so far, Iteration 6364:
Fitness = 0.847596: 00000001111101110110

Ambiguilles set 0 = 454530
Ambiguilles set 1 = 454530
Ambiguilles set 2 = 454530
Ambiguilles set 3 = 454528
Ambiguilles set 4 = 454530
Ambiguilles set 5 = 454530
Ambiguilles set 6 = 454530
Ambiguilles set 7 = 454530

TABLE 9

Summary of the 3 km Baseline Processing

| Epoch | Set Ambiguities Solved | Max. Fitness | Iterations | Time (sec) | % Search Space |
|---|---|---|---|---|---|
| 1 | 454529(7), 454528(1) | 0.988221 | 7661 | 2.712 | 0.73 |
| 2 | 454530(8) | 0.847946 | 6364 | 2.253 | 0.61 |
| 3 | 454530(8) | 0.838707 | 6364 | 2.253 | 0.61 |
| 4 | 454530(8) | 0.854284 | 6364 | 2.253 | 0.61 |

What is claimed is:

1. A method for determining a value for an integer number of phases using a computerized device, comprising the steps of:
   providing an initial set comprising a plurality of coded integer ambiguity strings;
   based upon a computed fitness value for each said string of said initial set, choosing a selected plurality of integer ambiguity strings from said initial set; and
   using information components from at least a first and second string of said selected plurality, generating a first and second offspring ambiguity string for evaluation.

2. The method of claim 1 wherein said evaluation comprises the step of analyzing an offspring fitness value computed for each of said first and second offspring ambiguity string, and an optimal determination of the value is used for subsequent determination of a position.

3. The method of claim 1 further comprising the steps of:
   generating a third and fourth offspring ambiguity string for evaluation, said first, second, third, and fourth offspring ambiguity strings to comprise a second set;
   computing a second set fitness value for each said string of said second set after said evaluation thereof; and
   choosing a subsequent selected plurality of integer ambiguity strings from said second set.

4. The method of claim 3 further comprising the step of using information components from at least a first and second string of said subsequent selected plurality, generating a first and second subsequent offspring ambiguity string for subsequent evaluation; said subsequent evaluation to comprise the step of analyzing said computed second set fitness values.

5. The method of claim 1 wherein each of said coded integer ambiguity strings is a digitized binary string, and an optimal determination of the value is used for subsequent determination of a position; and further comprising the step of: prior to said step of choosing, calculating a probability of selection in connection with each said computed fitness value.

6. The method of claim 5 wherein said step of choosing comprises comparing an allocated number based upon said probability of selection with a random number generated for each said string of said initial set; and wherein said evaluation comprises analyzing whether an optimal determination of the value has been made.

7. A global positioning system comprising:
   a device comprising a signal receiver and a processor capable of carrying out the method of claim 1; and
   a satellite in orbit for transmitting a signal wave to said device.

8. The system of claim 7 wherein said evaluation comprises analyzing whether an optimal determination of the value has been made and the value is used for determination of a position of said device.

9. A computerized device for receiving a signal transmitted from a distant source, comprising a processor for determination of a value for an integer number of phases; said determination of a value comprising the steps of:
   providing an initial set comprising a plurality of coded integer ambiguity strings;
   choosing a selected plurality of integer ambiguity strings from said initial set; and
   using information components from at least a first and second string of said selected plurality, generating a first and second offspring ambiguity string for evaluation.

10. The device of claim 9 operative within a global positioning system, and wherein the determination of a value further comprises the steps of:
    generating a third and fourth offspring ambiguity string for evaluation, said first, second, third, and fourth offspring ambiguity strings to comprise a second set; and
    choosing a subsequent selected plurality of integer ambiguity strings from said second set.

11. The device of claim 10 wherein the determination of a value further comprises the steps of:
    using information components from at least a first and second string of said subsequent selected plurality, generating a first and second subsequent offspring ambiguity string for subsequent evaluation; and
    said subsequent evaluation to comprise the step of analyzing said first and second subsequent offspring ambiguity strings.

12. The device of claim 9 further comprising the step of, prior to said step of choosing, computing a fitness value from which a probability of selection is calculated for each said string of said initial set; and wherein said evaluation comprises analyzing whether an optimal determination of the value has been made, and the value is used for subsequent determination of a position of said device.

13. The device of claim 12 wherein: the device is portable and the receiving can be done kinematically; the distant source comprises a satellite capable of transmitting a signal wave; the processor comprises a computer processing unit; and said step of choosing comprises comparing an allocated number based upon said probability of selection with a random number generated for each said string of said initial set.

14. The device of claim 13 wherein: each of said coded integer ambiguity strings is a digitized binary string; said step of generating comprises concatenating certain of said information components and mutating at least one bit in each of said first and second concatenated offspring ambiguity strings to produce, respectively, a mutated first and second string.

15. A system for determining a position comprising: a source for transmitting a signal wave; and a computerized device, located a distance from said source, having a signal wave receiver and a processor for determination of a value for an integer number of phases, said determination of a value comprising the steps of:
    providing an initial set comprising a plurality of coded integer ambiguity strings;
    choosing a selected plurality of integer ambiguity strings from said initial set; and
    using information components from at least a first and second string of said selected plurality, generating a first and second offspring ambiguity string for evaluation.

16. The system of claim 15 wherein each of said coded integer ambiguity strings is a digitized binary string; said step of generating comprises concatenating certain of said information components and mutating at least one bit in each of said concatenated first and second offspring ambiguity strings; and the determination of a value further comprises the step of converting each of said offspring ambiguity strings from said binary string to a corresponding base-ten integer.

17. The system of claim 15 wherein:

the determination of a value further comprises the step of prior to said step of choosing, computing a fitness value from which a probability of selection is calculated for each said string of said initial set; and said evaluation to comprise the steps of analyzing said computed fitness values, and analyzing said first and second offspring ambiguity strings for an optimal determination of the value.

18. The system of claim 15 wherein the determination of a value further comprises the steps of:

generating a third and fourth offspring ambiguity string for evaluation, said first, second, third, and fourth offspring ambiguity strings to comprise a second set;

choosing a subsequent selected plurality of integer ambiguity strings from said second set; and using information components from at least a first and second string of said subsequent selected plurality, generating a first and second subsequent offspring ambiguity string; and using information components from at least said first and a third string of said subsequent selected plurality, generating a third and fourth subsequent offspring ambiguity string.

19. The system of claim 18 wherein:

said first, second, third, and fourth subsequent offspring ambiguity strings are evaluated by analyzing whether an optimal determination of the value has been made;

the value is used for determination of the position, and the position is that of the device; and the computerized device further comprises a readout for the position.

20. The system of claim 19 wherein:

said step of generating a first and second subsequent offspring ambiguity string comprises concatenating certain of said information components of said first and second string of said subsequent selected plurality and mutating at least one bit in each of said concatenated first and second subsequent offspring ambiguity strings; and said step of generating a third and fourth subsequent offspring ambiguity string comprises concatenating certain of said information components of said first and third string of said subsequent selected plurality and mutating at least one bit in each of said concatenated third and fourth subsequent offspring ambiguity strings.

* * * * *